Patented Feb. 16, 1937

2,071,301

UNITED STATES PATENT OFFICE 2,071,301

PRODUCTION OF METHYLAMINES

Paul Herold and Karl Smeykal, Leuna, Germany, assignors to I. G. Farbenindustrie Aktiengesellschaft, Frankfort-on-the-Main, Germany No Drawing. Application April 11, 1934, Serial No. 720,042. In Germany April 19, 1933

3 Claims. (Cl. 202—42)

The present invention relates to a process of producing methylamines.

In the known catalytic reaction between methyl alcohol or dimethyl ether and an excess of ammonia, a reaction product is obtained which consists of unconverted ammonia, the three methylamines, the water formed during the reaction and in some cases unconverted methyl alcohol.

The separation of such mixtures into their components has hitherto usually been effected by converting the bases into their hydrochlorides and separating the dry salts by solvents having a selective action, because a fractional distillation of the free bases does not give the desired result by reason of their abnormal boiling behaviour.

The addition of a large amount of ammonia to the reaction product prior to its fractional distillation makes it possible to separate the tertiary amine from the other two amines because the tertiary amine passes over with ammonia in the form of an azeotropic mixture as the first fraction at a boiling point below that of pure ammonia.

The further fractional distillation of the remaining reaction mixture, however, still does not lead to monomethylamine and dimethylamine of a degree of purity such as is necessary for employment in practice.

On the contrary even by the sharpest fractionation with a large amount of reflux liquid and consequently with great consumption of steam, a fraction is obtained which though rich in monomethylamine still contains considerable amounts of ammonia and dimethylamine, and even the subsequent dimethylamine fraction is contaminated by large amounts of the primary amine and considerable amounts of ammonia. Only by a second fractional distillation of the resulting crude fractions can the necessary degree of purity of the two amines be obtained.

We have now found that practically pure monomethylamine and dimethylamine can be readily recovered from mixtures containing the said bases and water by first separating, preferably continuously, as a whole all the bases present from the water by distillation, the resulting mixture of bases being subsequently split up into its single components by fractional distillation.

This process is applicable to any mixture of monomethylamine and dimethylamine containing water. It is especially valuable for working up mixtures containing ammonia and, as the case may be, trimethylamine as well as the said two amines, especially mixtures obtained by the said catalytic conversion of methyl alcohol or dimethyl ether with ammonia. In this case all the three amines and the whole of the ammonia are first distilled off, preferably continuously, from the reaction mixture; by reason of the great difference in boiling point between the mixture of ammonia and methylamines on the one hand and the water, and in some cases methyl alcohol on the other hand, a simple distillation with but slight reflux and consequently low consumption of steam is sufficient.

By repeated distillation of the resulting anhydrous mixture of ammonia and methylamines a first runnings of ammonia and trimethylamine and a slight amount of intermediate runnings are obtained and then very pure, as for example of 98 to 99 per cent, primary methylamine and equally pure secondary methylamine are obtained.

Working in the said manner has proved very much more economical and is more readily manipulated in practice than the methods hereinbefore mentioned and therefore constitutes a considerable technical advance.

The following example will further illustrate the nature of this invention but the invention is not restricted to this example. The percentages are by weight.

Example 766.3 kilograms of a liquid mixture containing

|  | Per cent |
|---|---|
| Ammonia | 77.5 |
| Monomethylamine | 9.5 |
| Dimethylamine | 2.7 |
| Trimethylamine | 1.4 |
| Water | 8.9 |

(obtained by the catalytic reaction of an excess of ammonia with methyl alcohol) are introduced into the lower third of a pressure-distillation column which is operated continuously. Under a pressure of 10 atmospheres and at a temperature of the vapors leaving the column of 28° C., a temperature in the distillation vessel of 170° C. and a reflux ratio of 1: 2.5, a mixture of ammonia and methylamines distils over. 694.8 kilograms of a distillate are thus obtained which is a practically anhydrous mixture composed of

|  | Per cent |
|---|---|
| Ammonia | 85.0 |
| Monomethylamine | 10.4 |
| Dimethylamine | 2.9 |
| Trimethylamine | 1.5 |
| Water | 0.2 |

The residue remaining in the still consists of 67 kilograms of water which contains 0.15 per cent of ammonia and 0.15 per cent of dimethylamine.

The distillate obtained (694.8 kilograms) is subjected to fractional distillation whereby the following fractions are obtained:

1. 567.1 kilograms of an ammonia fraction composed of

| | Per cent |
|---|---|
| Ammonia | 98.2 |
| Monomethylamine | 0.1 |
| Trimethylamine | 1.7 |

2. 22.5 kilograms of an intermediate fraction composed of

| | Per cent |
|---|---|
| Ammonia | 92.9 |
| Monomethylamine | 6.65 |
| Trimethylamine | 0.45 |

3. 71.2 kilograms of a monomethylamine fraction composed of

| | Per cent |
|---|---|
| Ammonia | 3.7 |
| Monomethylamine | 96.0 |
| Dimethylamine | 0.15 |
| Trimethylamine | 0.15 |

4. 0.7 kilogram of an intermediate fraction composed of

| | Per cent |
|---|---|
| Ammonia | 4.0 |
| Monomethylamine | 81.1 |
| Dimethylamine | 13.5 |
| Water | 0.4 |

5. 19.9 kilograms of a dimethylamine fraction as residue composed of

| | Per cent |
|---|---|
| Water | 6.0 |
| Calculated on an anhydrous base { Dimethylamine | 98.2 |
| Monomethylamine | 1.6 |
| Ammonia | 0.2 |

In the monomethylamine fraction 94.6 per cent of the total monomethylamine are thus obtained in a highly concentrated form. In the dimethylamine fraction 90.2 per cent of the total dimethylamine are obtained in a highly concentrated form.

In contradistinction thereto, if 734.8 kilograms of the same mixture of ammonia and methylamine bases containing water as used above, are subjected to fractional distillation without the preliminary separation of the bases from the water (which is the characteristic feature of the present invention) the following fractions are obtained:

1. 524.5 kilograms of an ammonia fraction composed of

| | Per cent |
|---|---|
| Ammonia | 97.92 |
| Monomethylamine | 0.23 |
| Dimenthylamine | 0.04 |
| Trimethylamine | 1.81 |

2. 59.7 kilograms of an intermediate fraction composed of

| | Per cent |
|---|---|
| Ammonia | 65.3 |
| Monomethylamine | 33.5 |
| Dimethylamine | 0.8 |
| Trimethylamine | 0.4 |

3. 47.8 kilograms of a monomethylamine fraction composed of

| | Per cent |
|---|---|
| Ammonia | 8.4 |
| Monomethylamine | 85.0 |
| Dimenthylamine | 6.3 |
| Trimethylamine | 0.2 |

4. 8.2 kilograms of an intermediate fraction composed of

| | Per cent |
|---|---|
| Ammonia | 12.0 |
| Monomethylamine | 47.0 |
| Dimenthylamine | 36.2 |
| Trimethylamine | 1.2 |
| Water | 2.3 |

5. 23.5 kilograms of a dimethylamine fraction composed of

| | Per cent |
|---|---|
| Water | 40.0 |
| Calculated on an anhydrous base { Monomethylamine | 14.1 |
| Dimethylamine | 82.4 |
| Ammonia | 3.5 |

6. 55.7 kilograms of a residue composed of water with

| | Per cent |
|---|---|
| Ammonia | 0.18 |
| Dimethylamine | 0.18 |

This means that by fractional distillation in the presence of the water contained in the initial mixture only 59.3 per cent of the total monomethylamine are obtained in the main fraction which, moreover, contains the monomethylamine in concentration of only 85 per cent. In the dimethylamine fraction only 58.8 per cent of the total dimethylamine are obtained and the concentration of the said fraction in dimethylamine is only 82.4 per cent.

What we claim is:—

1. The process of producing substantially pure monomethylamine and dimethylamine from mixtures containing mono-, di- and trimethylamines, ammonia and water which comprises subjecting such mixtures to a distillation under pressure in order to separate the amines and ammonia from the water as a substantially anhydrous mixture and subjecting this substantially anhydrous mixture to fractional distillation to obtain a first fraction of ammonia and trimethylamine and other fractions containing monomethylamine and dimethylamine in substantially pure form.

2. The process of producing substantially pure monomethylamine and dimethylamine from mixtures containing mono-, di- and trimethylamine, ammonia and water which comprises continuously subjecting such mixtures to a distillation under pressure in order to separate the amines and ammonia as a substantially anhydrous mixture and subjecting this substantially anhydrous mixture to fractional distillation to obtain a first fraction of ammonia and trimethylamine and other fractions containing monomethylamine and dimethylamine in substantially pure form.

3. The process of producing substantially pure monomethylamine and dimethylamine from mixtures containing mono-, di- and trimethylamine, ammonia, methyl alcohol and water which comprises subjecting such mixtures to a distillation under pressure in order to separate the amines and ammonia from the methyl alcohol and water as a substantially anhydrous mixture and subjecting this substantially anhydrous mixture to fractional distillation to obtain a first fraction of ammonia and trimethylamine and other fractions containing monomethylamine and dimethylamine in substantially pure form.

PAUL HEROLD.
KARL SMEYKAL.